United States Patent
Xu et al.

[11] Patent Number: 5,945,176
[45] Date of Patent: Aug. 31, 1999

[54] GRAPHITE INTERCALATION COMPOUND AND PRODUCTION METHOD THEREOF

[75] Inventors: BingShe Xu, Yokohama; Shun-ichiro Tanaka, 1-35-12, Hongo, Seya-ku, Yokohama-shi, Kanagawa-ken, both of Japan

[73] Assignees: Research Development Corporation of Japan, Saitama-ken; Shun-ichiro Tanaka, Yokohama, both of Japan

[21] Appl. No.: 09/041,966

[22] Filed: Mar. 13, 1998

Related U.S. Application Data

[62] Division of application No. 08/626,457, Apr. 2, 1996, Pat. No. 5,762,898.

[30] Foreign Application Priority Data

Apr. 3, 1995 [JP] Japan ................................. 7-077682

[51] Int. Cl.$^6$ ........................................................ B05D 3/00
[52] U.S. Cl. ........................... 427/551; 427/192; 427/215; 427/294; 427/331; 427/595
[58] Field of Search .................................. 427/551, 595, 427/215, 294, 331, 192

[56] References Cited

U.S. PATENT DOCUMENTS

| | | | |
|---|---|---|---|
| 4,560,409 | 12/1985 | Goldberger et al. | 75/130 |
| 4,729,884 | 3/1988 | Sugiura et al. | 423/448 |
| 4,945,014 | 7/1990 | Miyabayashi et al. | 429/218 |
| 5,042,059 | 8/1991 | Watanabe et al. | 378/145 |
| 5,316,636 | 5/1994 | Bunshah et al. | 204/157.47 |
| 5,472,749 | 12/1995 | Dravid et al. | 427/580 |
| 5,482,797 | 1/1996 | Yamada et al. | 429/218 |
| 5,547,748 | 8/1996 | Ruoff et al. | 428/323 |
| 5,593,740 | 1/1997 | Strumban et al. | 427/577 |

OTHER PUBLICATIONS

J.C. Bailar et al., "Comprehensive Inorganic Chemistry", Pergamon Press, 1973, pp. 1291–1293, (No month avail.).

D. Ugarte et al., "Generation of Graphitic Onions", Spring Series in Solid State Sciences, vol. 117, Electronic Properties of Fullerenes, 1993, pp. 78–82, (No month avail.).

D. Ugarte, "How to Fill or Empty a Graphitic Onion", Chemical Physics Letters, vol. 209, No. 1.2, Jun. 25, 1993, pp. 99–103.

Yu N. Novikov et al., "New production process for graphite lamellar compounds with transition metals", (Abstract No. 84: 38105k), Chemical Abstracts, vol. 84, No. 6, Feb. 9, 1976, pp. 515–516.

M.E. Vol'pin et al, "Reduction of graphite intercalation compounds with transition metal chlorides", (Abstract No. 106711a), Chemical Abstracts, vol. 74, No. 20, May 17, 1971, pp. 474.

*Primary Examiner*—Bernard Pianalto
*Attorney, Agent, or Firm*—Finnegan, Henderson, Farabow, Garrett & Dunner, L.L.P.

[57] ABSTRACT

An onion-like graphite 2 is produced by irradiating an electron beam to an amorphous carbon 3 under an active aluminum nanoparticle 1. By further irradiating the electron beam to the onion-like graphite 2 to intercalate aluminum atoms constituting the aluminum nanoparticle 1 in a space between (001) plane and (002) plane of the onion-like graphite 2 having a layer structure, an intercalation compound 4 is produced. Or, after the aluminum nanoparticles were driven and disposed on the onion-like graphite by electron beam, or the like, by irradiating the electron beam to intercalate aluminum atoms in the space between the (001) plane and the (002) plane of the onion-like graphite having a layer structure, the intercalation compound is produced.

4 Claims, 5 Drawing Sheets

GRAPHITE INTERCALATION COMPOUND AND PRODUCTION METHOD THEREOF

This is a division of application Ser. No. 08/626,457, filed Apr. 2, 1996 U.S. Pat. No. 5,762,898.

BACKGROUND OF THE INVENTION

1. Field of the Invention

This invention relates to a graphite intercalation compound and a production method thereof.

2. Description of the Related Art

The graphite intercalation compound is produced by intercalated a different kind of substance in a space of graphite or the like having a layer structure, is capable of improving electric conductivity and is applicable to functional material such as a catalyst utilizing properties of the intercalated substance. Various intercalation compounds are synthesized and their physical properties and/or applications thereof are studied.

As examples of a different kind of substance intercalated in a space of graphite having a layer structure, alkali metals such as Li, Na, or K, alkaline-earth metals such as Ca, Sr, or Ba, rare earth elements such as Sm, Eu, or Yb, transition metals such as Mn, Fe, Ni, Co, Zn, or Mo, halogens such as $Br_2$, ICl, or IBr, acids such as $HNO_3$, $H_2SO_4$, HF, or $HBF_4$, and compounds such as $MgCl_2$, $FeCl_2$, $FeCl_3$, $NiCl_2$, $AlCl_3$, or $SbCl_5$ are reported.

Conventionally, the graphite intercalation compound intercalated a different kind of substance in a space having a layer structure is produced by (a) a method of contacting graphite with a gaseous phase or a liquid phase of substance to intercalate, or (b) an electrolysis of electrolyte including intercalated substance using a graphite electrode. For example, a graphite intercalation compound using alkali metals is obtained by coexisting graphite with the alkali metals under a vacuum and heating them. A graphite intercalation compound using halogens is produced by contacting graphite with a liquid phase or vapor of $Br_2$, ICl, or IBr. A graphite intercalation compound using alkaline-earth metals such as Ca, Sr, or Ba, or rare earth elements such as Sm, Eu, or Yb is produced by mixing graphite ultrafine powder with metal powder, applying pressure to 1 to 2 MPa, and pressureless sintered.

A graphite intercalation compound using transition metals such as Fe, Co, or Mo is produced by synthesizing an intercalation compound using a chloride of these metals, and reducing the compound slowly at/or below room temperature using $NaBH_4$, $LiAlH_4$, Na or the like. The reduction method has, however, low reproducibility and a drawback that a graphite intercalation compound of transition metals cannot be stably obtained.

Above-mentioned conventional methods for producing a graphite intercalation compound utilizes powder calcination, powder-gaseous/liquid phase reaction, electrolysis or the like. These normal production methods are suitable for obtaining a graphite intercalation compound as an aggregate. However, a graphite intercalation compound in a controlled shape, distribution and/or states, for example, producing an intercalation compound on a specified nanoscase area of graphite, cannot be produced.

As described above, conventional graphite intercalation compound has drawbacks of low reproducibility in intercalating transition metals in a space of graphite having a layer structure, and of limited number of applicable transition metals.

Conventional methods for producing a graphite intercalation compound are suitable for obtaining a graphite intercalation compound as an aggregate. However, a graphite intercalation compound cannot be produced in a controlled shape, distribution and/or states. To enlarge a range of graphite intercalation compound applications, it is needed that a graphite intercalation compound can be produced in a controlled status, i.e. selectively producing an intercalation compound on a specified nanoscase area of graphite.

SUMMARY OF THE INVENTION

An object of the present invention is to provide a graphite intercalation compound and a production method thereof to enhance controllability such as enabling a production of an intercalation compound on a specified nanoscale area of the graphite, and simultaneously to improve reproducibility.

In the graphite intercalation compound of the present invention, aluminum atoms are intercalated by irradiating an electron beam in a space between (001) plane and (002) plane of the graphite having a layer structure.

According to the production method of the graphite intercalation compound of the present invention, an onion-like graphite upon which active aluminum nanoparticles are disposed is irradiated the electron beam under a vacuum atmosphere together with said aluminum nanoparticles to shrink said onion-like graphite, and aluminum atoms constituting said aluminum nanoparticles are intercalated in the space between the (001) plane and the (002) plane of said onion-like graphite having a layer structure.

In the intercalation compound of the present invention, the aluminum atoms are intercalated in the space between the (001) plane and the (002) plane of the graphite having a layer structure. Giant fullerens that an intercalation distance is equal to the graphite such as the onion-like graphite are cited as an example of said graphite. The graphite intercalation compound of the present invention is formed by irradiating the electron beam to the onion-like graphite upon which the active aluminum nanoparticles are disposed, and by intercalating aluminum atoms in the space between the (001) plane and the (002) plane of the onion-like graphite having a layer structure.

When disposing the active aluminum nanoparticles on the onion-like graphite, and irradiating the electron beam on the onion-like graphite, the onion-like graphite shrank and the aluminum nanoparticles become smaller. Simultaneously aluminum atoms constituting the aluminum nanoparticles are intercalated in the space of the graphite having a layer structure. The electron beam having an intensity of not less than $1 \times 10^{19}$ $e/cm^2 \cdot sec$ ($2A/cm^2$) is preferred. If the intensity of the electron beam is less than $1 \times 10^{19}$ $e/cm^2 \cdot sec$, carbon atoms can not be activated so as to shrink the onion-like graphite. In other words, the electron beam having the intensity of not less than $1 \times 10^{19}$ $e/cm^2 \cdot sec$ induces a localized heating effect and an atom displacement (knock-on) effect to the onion-like graphite. Thereby, the onion-like graphite can shrink, and the aluminum atoms can be intercalated into the space of the onion-like graphite. The irradiation of the electron beam under a vacuum of $10^{-5}$ Pa or less is preferable. If the vacuum exceeds $10^{-5}$ Pa, remaining gas atoms may be adsorbed to prevent the aluminum atoms from intercalating into the onion-like graphite.

As the onion-like graphite that drives and disposes the aluminum nanoparticles thereon, independent and controllable one is used. An original onion-like graphite may be in size capable of driving and disposing the aluminum nanoparticle. For example, the original onion-like graphite having a diameter of 10 to 30 nm is preferable.

As the active aluminum nanoparticles disposed on the onion-like graphite, pure aluminum nanoparticles having no surface oxide film or the like are cited as an example. A diameter of the aluminum nanoparticles is preferable in the range from 5 to 20 nm. If the diameter of the aluminum nanoparticles is less than 5 nm or exceeds 20 nm, in any case, the aluminum atoms may not be intercalated correctly in the space of the onion-like graphite having a layer structure, and may not also be driven and disposed adequately on the onion-like graphite, as described later. Above-mentioned production method of the aluminum nanoparticles is not limited thereto. For example, the aluminum nanoparticles can be produced by irradiating the electron beam under a vacuum to metastable aluminum oxide particles, as described later.

The onion-like graphite is independent and controllable which is one starting material of the graphite intercalation compound of the present invention. Therefore, preferable methods for producing the onion-like graphite are as follows:

1. Amorphous carbon such as i-carbon upon which active aluminum nanoparticles are disposed is irradiated the electron beam under a vacuum atmosphere to produce the onion-like graphite.

2. Metastable aluminum oxide particles disposed upon amorphous carbon such as i-carbon are irradiated the electron beam under a vacuum atmosphere to produce the onion-like graphite.

In the method 1. for producing the onion-like graphite, a diameter of the active aluminum nanoparticles disposed on the amorphous carbon is preferable in the range from 5 to 100 nm. If the diameter of the aluminum nanoparticles exceeds 100 nm, the amorphous carbon thereunder can not be activated sufficiently. Aluminum nanoparticles having a diameter of less than 5-nm are difficult to produce. More preferable diameter of the aluminum nanoparticles is in the range from 5 to 20 nm.

When the electron beam is irradiated to the amorphous carbon together with the active aluminum nanoparticles under the above-mentioned conditions, an atomic arrangement of the amorphous carbon existed under the active aluminum nanoparticles is changed to produce the onion-like graphite under and around the active aluminum nanoparticles. The onion-like graphite is obtained independently to enable irradiating continuously the electron beam easily. Therefore, the onion-like graphite is suitable for the material of the graphite intercalation compound of the present invention.

In producing the onion-like graphite, the electron beam having an intensity of not less than $1\times10^{19}$ e/cm$^2$·sec (2A/cm$^2$) is preferred. If the intensity of the electron beam is less than $1\times10^{19}$ e/cm$^2$·sec, the carbon atoms can not be activated so as to produce the onion-like graphite. In other words, the electron beam having the intensity of not less than $1\times10^{19}$ e/cm$^2$·sec induces a localized heating effect and an atom displacement (knock-on) effect to the onion-like graphite. Thereby, the onion-like graphite can shrink. The irradiation of the electron beam under a vacuum of $10^{-5}$ Pa or less is preferable. If the vacuum exceeds $10^{-5}$ Pa, remaining gas atoms may be adsorbed into the carbon to prevent the producing of the onion-like graphite.

The onion-like graphite produced according to the method 1. involves the aluminum nanoparticles. The aluminum nanoparticles are used as another starting material of the graphite intercalation compound of the present invention. In other words, when the electron beam is irradiated continuously to the onion-like graphite produced under the aluminum nanoparticles, the graphite intercalation compound of the present invention can be produced. Requirements thereof are already described above.

In the method 2. for producing the onion-like graphite, as the metastable aluminum oxide particles, θ-Al$_2$O$_3$ particles which are metastable phase of Al$_2$O$_3$ are cited as an example. In irradiating to such metastable aluminum oxide particles, the electron beam having an intensity of not less than $1\times10^{19}$ e/cm$^2$·sec (2A/cm$^2$) is preferred. For example, when the electron beam having an intensity of not less than $1\times10^{19}$ e/cm$^2$·sec is irradiated to the θ-Al$_2$O$_3$ particles disposed on the amorphous carbon, carbon atoms are provided as constitutional atoms from carbon source of adsorbed atoms or impurities existed on the θ-Al$_2$O$_3$ particles to produce the onion-like graphite around the metastable aluminum oxide particles. The onion-like graphite is obtained independently to enable irradiating continuously the electron beam easily. Therefore, the onion-like graphite is suitable for the material of the graphite intercalation compound of the present invention.

When using the onion-like graphite produced according to the method 2., the active aluminum nanoparticles are driven and disposed thereon and the electron beam is then irradiated under above-mentioned conditions to produce the graphite intercalation compound of the present invention. To drive and dispose the aluminum nanoparticles on the onion-like graphite, the electron beam is irradiated to the aluminum nanoparticles and is scanned to move the aluminum nanoparticles. The aluminum nanoparticles driven and disposed on the onion-like graphite can be driven by the electron beam, and is in size capable of disposing on the onion-like graphite. A diameter of about 5 to 20 nm of the aluminum nanoparticles is preferable, as mentioned above. The aluminum nanoparticles can be secondarily produced in the production process of the onion-like graphite by irradiating the electron beam to the θ-Al$_2$O$_3$ particles.

The graphite intercalation compound of the present invention can be obtained by irradiating the electron beam to independently controllable giant fullerens such as the onion-like graphite upon which the aluminum nanoparticles are disposed. Therefore, controllability of states, shape and/or distribution that, for example, the graphite intercalation compound can be produced on a specified nanoscale area of the graphite, and reproducibility of the graphite intercalation compound are remarkably enhanced. Moreover, the intercalation compound can be produced in an independent state under controlled conditions. Thereby, physical properties of the intercalation compound can be grasped, and various operations and controls can be realized. Generally, irradiating the electron beam under controlled heating conditions is difficult. Therefore, it is significant that the intercalation compound can be produced by irradiating the electron beam in a room temperature stage.

BRIEF DESCRIPTION OF THE DRAWINGS

In aid that the invention may be illustrated, more easily appreciated and readily carried into effect by those skilled in this art, embodiments of the invention will now be described by way of non-limiting example any with reference to the accompanying drawings and wherein.

DESCRIPTION OF THE PREFERRED EMBODIMENTS

Embodiments of the present invention will be described with reference to these drawings.

Embodiment 1

Production of active aluminum nanoparticles will be described. First, spherical θ-$Al_2O_3$ particles (purity 99.8%) having a diameter of about 100 nm were prepared. The particles were dispersed in alcohol, applied to an amorphous carbon support film made of i-carbon and dried. Secondly, the amorphous carbon support film disposed spherical θ$Al_2O_3$ particles were arranged in a room temperature stage which was disposed in a vacuum chamber of 200 kV TEM (JEOL, JEM-2010). Thirdly, the vacuum chamber was evacuated to $1\times10^{-5}$ Pa. Fourthly, an electron beam having an intensity of $1.3\times10^{20}$ $e/cm^2 \cdot sec$ ($20A/cm^2$) was irradiated to the θ-$Al_2O_3$ particles having a diameter of about 100 nm disposed on the amorphous carbon support film. With the irradiation of the electron beam, the aluminum nanoparticles having a diameter of about 5 to 15 nm were produced on the amorphous carbon support film.

Using the aluminum nanoparticles, an onion-like graphite and a graphite intercalation compound thereof were produced. With leaving the TEM vacuum (constant vacuum level) where the amorphous carbon support film was disposed, aluminum nanoparticles having a longer diameter of about 15 nm were selected from the aluminum nanoparticles on the carbon support film, the electron beam having an intensity of $1.3\times10^{20}$ $e/cm^2 \cdot sec$ ($20A/cm^2$) was irradiated (irradiation diameter=250 nm) to the aluminum nanoparticles having a longer diameter of about 15 nm together with the amorphous carbon thereunder.

Figure 1A:
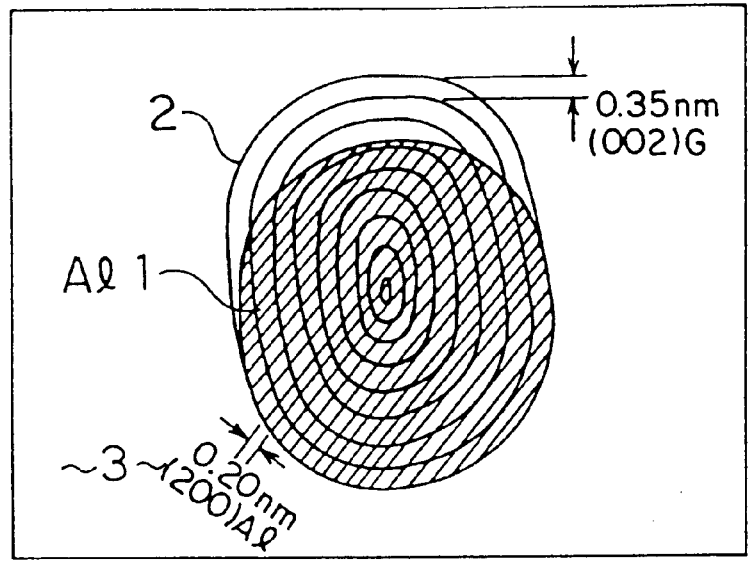
FIG. 1A and FIG. 1B are schematic diagrams of a method for producing a graphite intercalation compound according to the embodiment 1 of the present invention.

While irradiating the electron beam, a states of the aluminum nanoparticles and the amorphous carbon in TEM was observed in-situ. With reference to schematic diagrams of FIG. 1A and FIG. 1B, the observed result will be described. After 300 seconds irradiation of the electron beam, carbon structure 2 having an elliptic and concentric circle with a longer diameter of 15 nm under the aluminum nanoparticle 1 was produced, as shown in FIG. 1A. Because a distance between layers of the carbon structure having an elliptic and concentric circle was about 0.35 nm, the carbon structure was identified as an onion-like graphite 2. Around the onion-like graphite 2, the amorphous carbon 3 still existed.

Figure 1B:
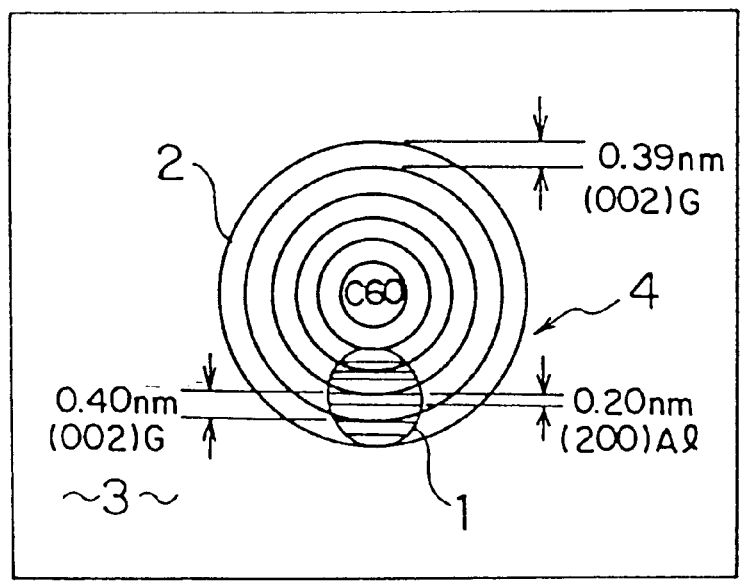
Figure 2:
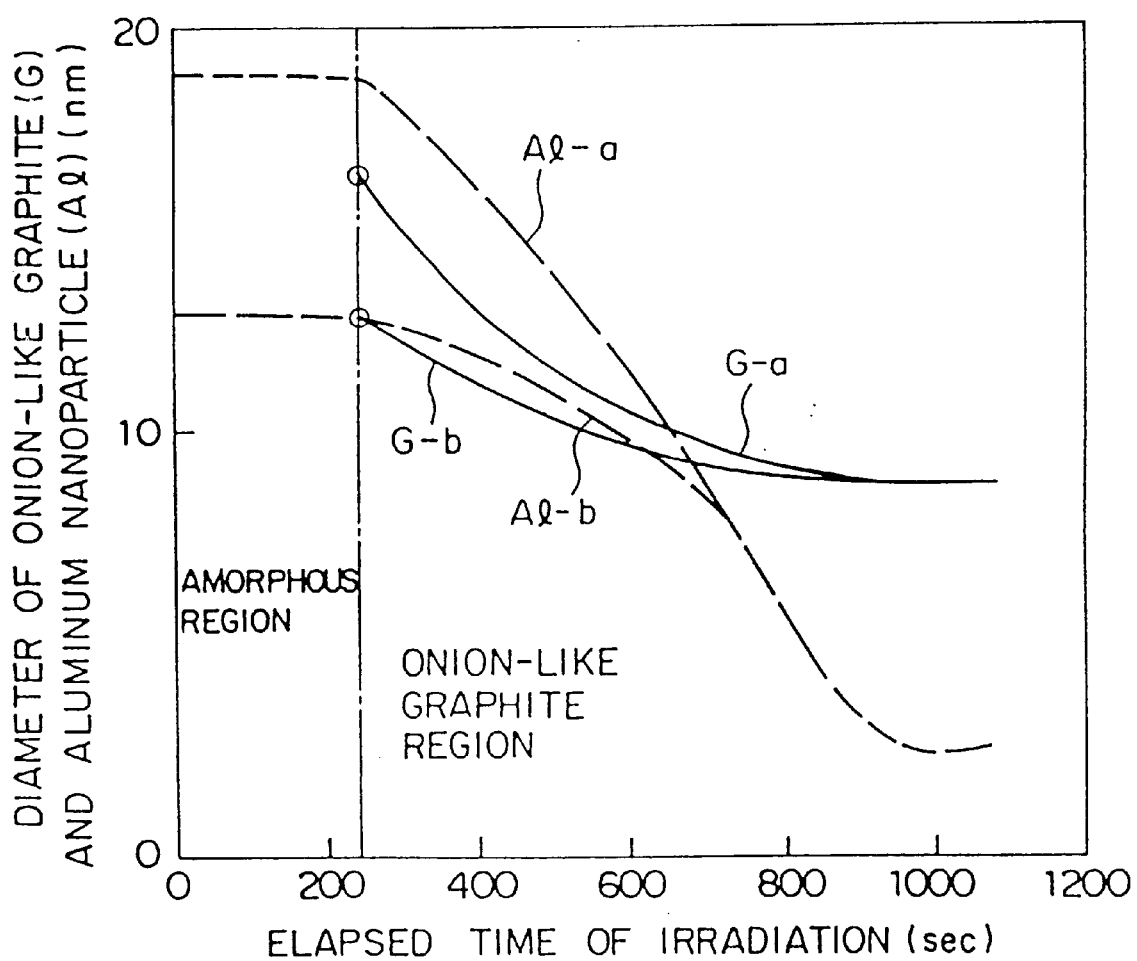
FIG. 2 is a graph showing a change of longer and shorter diameter of aluminum nanoparticles and an onion-like graphite with the elapsed time of the irradiation of the electron beam in the production method of the graphite intercalation compound according to the embodiment 1 of the present invention.

While further irradiating the electron beam, the onion-like graphite 2 shrank gradually to become smaller in a concentric circle shape, and the aluminum nanoparticle 1 also became smaller. After 800 to 1000 seconds irradiation of the electron beam, the onion-like graphite 2 shrank in the concentric circle shape, and the aluminum nanoparticle 1 became smaller to have a diameter of 2 nm, as shown in FIG. 1B. FIG. 2 shows a change of longer (Al-a) and shorter (Al-b) diameter of the aluminum nanoparticle 1 and a change of longer (G-a) and shorter (G-b) diameter of the onion-like graphite 2 with the elapsed time of the irradiation of the electron beam. As apparent-from FIG. 2, the aluminum nanoparticle 1 and the onion-like graphite 2 in elliptic shapes shrank to become circular shapes.

With becoming smaller, aluminum atoms (atom aggregates) constituting the aluminum nanoparticle 1 were intercalated in a space (van der Waals bond layer) between (001) plane and (002) plane of the onion-like graphite 2 having a layer structure to form a graphite intercalation compound 4. The graphite intercalation compound 4 was identified with Energy Dispersive X-ray Spectoroscopy (EDS). A distance between layers of the onion-like graphite 2 widened to 0.40 nm in spite of 0.334 nm in normal status. Twenty percent of lattice distortion existed.

In the graphite intercalation compound 4, the aluminum atom aggregates constituting the aluminum nanoparticle 1 were arranged so as to parallel {002} plane of the aluminum nanoparticle 1 with the (002) plane of the onion-like graphite 2. The aluminum aggregates and the onion-like graphite 2 were in epitaxy relations. Lattice spacing d between the (001) plane and the (002) plane of the onion-like graphite 2 where the aluminum atoms were clearly identified was 0.40 nm. Lattice of the onion-like graphite 2 expanded to be twice the length of 0.20 nm (which is a distance between the (200) planes of the aluminum). In this portion, crystal structure may be equivalent to that of $Al_2C_6$.

Figure 3:
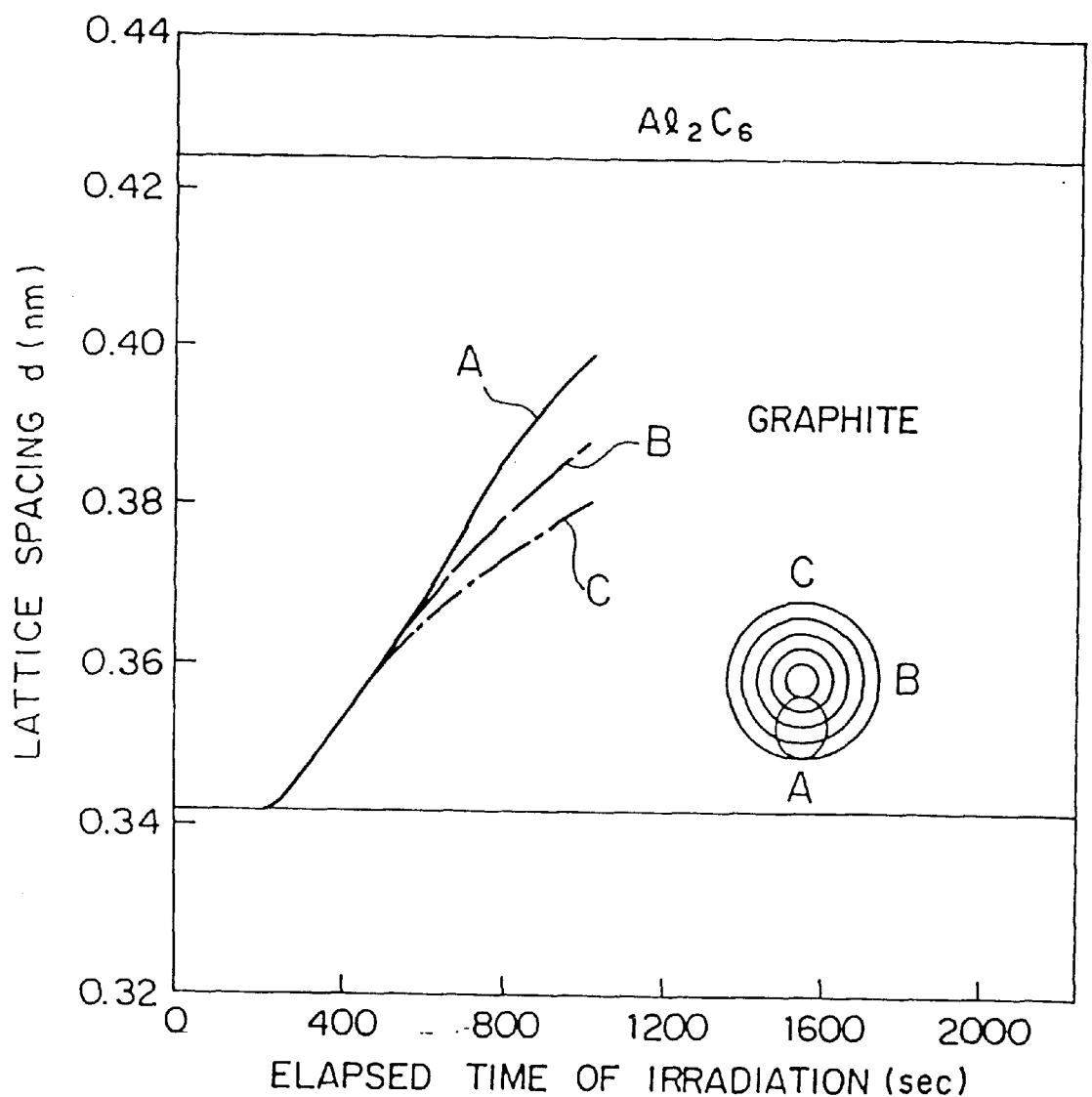
FIG. 3 is a graph showing a change of a lattice spacing d of each portion of the onion-like graphite with the elapsed time of the irradiation of the electron beam in the production method of the graphite intercalation compound according to the embodiment 1 of the present invention.

FIG. 3 shows a change of a lattice spacing d of each portion (A, B, C) of the onion-like graphite 2 with the elapsed time of the irradiation of the electron beam. As apparent from FIG. 3, aluminum atoms dispersed in each portion of the onion-like graphite 2.

Thus, by irradiating the electron beam to the onion-like graphite 2 upon which the aluminum nanoparticle 1 was disposed, the graphite intercalation compound 4 that aluminum atoms (aluminum atom aggregates) constituting the aluminum nanoparticle 1 were intercalated into the space between the (001) plane and the (002) plane of the onion-like graphite 2 having a layer structure was obtained. This production of the graphite intercalation compound 4 is apparently based on both a localized heating effect and an atom displacement (knock-on) effect by the irradiated electron.

Embodiment 2

Production of an onion-like graphite and aluminum nanoparticles will be described. First, spherical θ-$Al_2O_3$ particles (purity 99.8%) with a diameter of about 100 nm were prepared. The particles were dispersed in alcohol, applied to an amorphous carbon support film made of i-carbon and dried. Secondly, the amorphous carbon support film disposed spherical θ-$Al_2O_3$ particles were arranged in a room temperature stage which was disposed in a vacuum chamber of 200 kV TEM (JEOL, JEM-2010).

Thirdly, the vacuum chamber was evacuated to $1\times10^{-5}$ Pa. Fourthly, an electron beam having an intensity of $1.3\times10^{20}$ $e/cm^2 \cdot sec$ ($20A/cm^2$) was irradiated to the θ-$Al_2O_3$ particles having a diameter of about 100 nm disposed on the amorphous carbon support film. With the irradiation of the electron beam, an onion-like graphite having a diameter of about 10 to 30 nm and aluminum nanoparticles having a diameter of about 5 to 10 nm were produced on the amorphous carbon support film.

Figure 4:
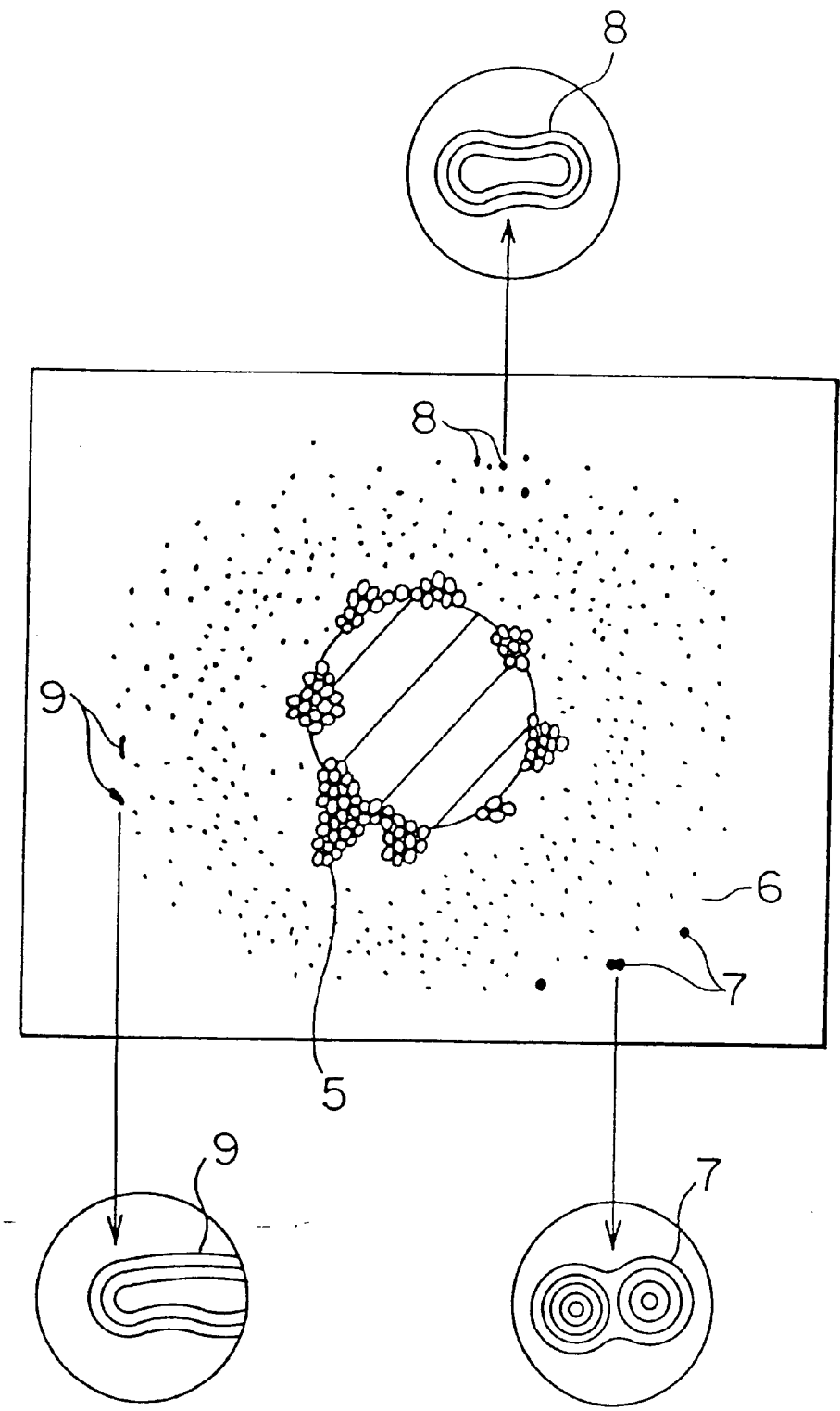
FIG. 4 is a schematic diagram showing a production states of the aluminum nanoparticles and the onion-like graphite used for producing the graphite intercalation compound according to the embodiment 2 of the present invention.

FIG. 4 shows an observed result of a states of the onion-like graphite and the aluminum nanoparticles in TEM. As shown in FIG. 4, by irradiating the electron beam to the θ-$Al_2O_3$ particles, α-$Al_2O_3$ particles 5 which was smaller than the θ-$Al_2O_3$ was produced. Around the α-$Al_2O_3$ particle 5, an aluminum nanoparticle 6 having a diameter of about 5 to 10 nm and an onion-like graphite 7 having a diameter of about 10 to 30 nm were produced. Around the initial θ-$Al_2O_3$ particles, a carbon nanocapsule 8 having a diameter of about 20 nm and a carbon nanotube 9 having a thickness of about 10 nm were also produced.

Figure 5A:
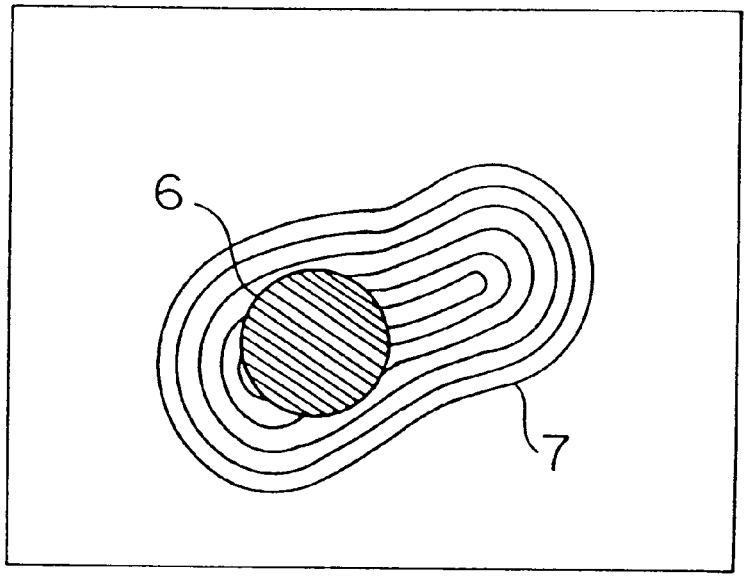
FIG. 5A and FIG. 5B are schematic diagrams of a method for producing a graphite intercalation compound according to the embodiment 2 of the present invention.

Using the onion-like graphite and the aluminum nanoparticles, a graphite intercalation compound was produced. A status of the production in TEM was observed in-situ. With reference to schematic diagrams of FIG. 5A and FIG. 5B, the observed result will be described. The onion-like graphite 7 having a longer diameter of about 15 nm and the aluminum nanoparticle 6 having a diameter of about 5 nm near the graphite were selected. With irradiating and scanning the electron beam to the aluminum nanoparticle 6, the aluminum nanoparticle 6 was driven and disposed on the onion-like graphite 7, as shown in FIG. 5A.

Figure 5B:
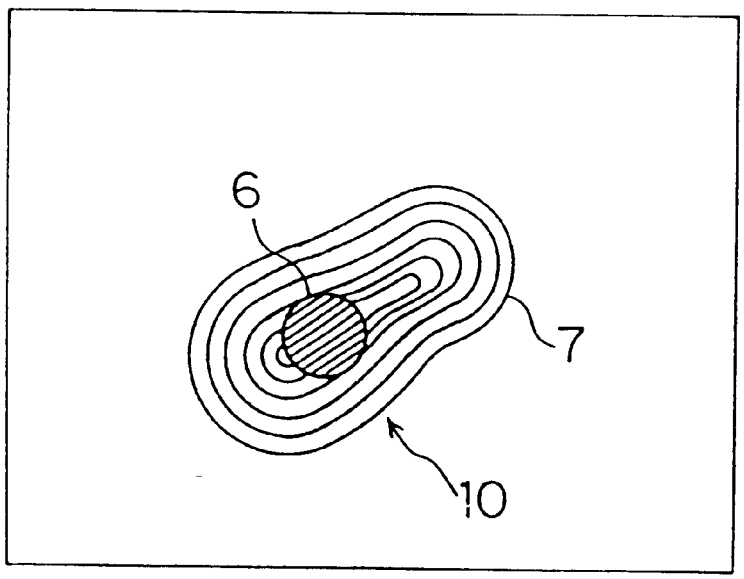

An electron beam having an intensity of $1.3 \times 10^{20}$ e/$cm^2$·sec (20A/$cm^2$) was irradiated (irradiation diameter= 250 nm) to the onion-like graphite 7 driven and disposed the aluminum nanoparticle 6. After the elapsed time of the irradiation, the onion-like graphite 7 shrank gradually to become smaller. After 560 seconds irradiation of the electron beam, a graphite intercalation compound 10 that aluminum atoms (aluminum atom aggregates) constituting the aluminum nanoparticle 6 were intercalated into a space (between van der Waals bonding layers) between (001) plane and (002) plane of the onion-like graphite 7 having a layer structure was obtained, as shown in FIG. 5B. In the graphite intercalation compound 10, the onion-like graphite 7 had a longer diameter of about 10 nm and the aluminum nanoparticle 6 had a diameter of about 2 nm.

Thus, by irradiating the electron beam to the onion-like graphite upon which the aluminum nanoparticles were driven and disposed, a graphite intercalation compound intercalated the aluminum nanoparticles into the space between the (001) plane and the (002) plane of the onion-like graphite having a layer structure was obtained. This production of the graphite intercalation compound is apparently based on both a localized heating effect and an atom displacement (knock-on) effect by the irradiated electron.

As apparent from these embodiments, according to the present invention, the intercalation compound can be produced by irradiating the electron beam and intercalating the aluminum atoms in the space between the (001) plane and the (002) plane of the graphite having a layer structure under easily controllable conditions of room temperature stage. Therefore, various manipulations with electron beams having a diameter in-nanometer can-be realized.

As described above, according to the present invention, for example, the graphite intercalation compound can be produced on a specified nanoscale area of the graphite, therefore controllability of states, shape and/or distribution of the graphite intercalation compound are remarkably enhanced. With satisfying such requirements, the intercalation compound that the aluminum atoms are intercalated in the space of the graphite having a layer structure can be obtained repeatedly.

What is claimed is:

1. A method for producing a graphite intercalated compound comprising the steps of:

disposing an active aluminum nanoparticle on graphite having a multi-layer concentric spherical structure, said multi-layer concentric spherical structure including crystal faces corresponding to a (001) plane and a (002) plane of the graphite, and irradiating an electron beam on said graphite with the aluminum nanoparticle under a vacuum atmosphere to shrink said graphite and simultaneously intercalate aluminum atoms constituting the aluminum nanoparticle in a space between said crystal faces of said graphite.

2. A method as claimed in claim 1, wherein said graphite is produced by disposing a metastable aluminum oxide particle on amorphous carbon, and by irradiating the electron beam on the metastable aluminum oxide particle under a vacuum atmosphere.

3. A method as claimed in claim 1, wherein the electron beam has an intensity of $1 \times 10^{19}$ e/$cm^2$·sec or more.

4. A method as claimed in claim 1, wherein said graphite is produced by disposing an active aluminum nanoparticle on amorphous carbon, and by irradiating the electron beam on the amorphous carbon with the aluminum nanoparticle under a vacuum atmosphere.

* * * * *

UNITED STATES PATENT AND TRADEMARK OFFICE
CERTIFICATE OF CORRECTION

PATENT NO. : 5,945,176
DATED : August 31, 1999
INVENTOR(S) : Bingshe Xu, et. al.

It is certified that error appears in the above-indentified patent and that said Letters Patent is hereby corrected as shown below:

It is certified that an error appears in the above-identified patent and that said Letters Patent is hereby corrected as shown below:

Title page, Item [75], lines 2-3, under "Inventors," delete "1-35-12, Hongo, Seya-ku, Yokohama-shi, Kanagawa-ken," and insert --Yokohama--; and Title page, Item [73], lines 2-3, under "Assignees," delete "Shun-ichiro Tanaka, Yokohama" and insert --Kabushiki Kaisha Toshiba--.

Signed and Sealed this

Twentieth Day of March, 2001

Attest:

NICHOLAS P. GODICI

Attesting Officer

Acting Director of the United States Patent and Trademark Office

UNITED STATES PATENT AND TRADEMARK OFFICE
CERTIFICATE OF CORRECTION

PATENT NO. : 5,945,176
DATED : August 31, 1999
INVENTOR(S) : Bingshe Xu et al.

It is certified that error appears in the above-identified patent and that said Letters Patent is hereby corrected as shown below:

Title page,
Item [75], lines 2-3, under "Inventors," delete "1-35-12, Hongo, Seya-kum Yokohamashi, Kanagawa-ken," and insert -- Yokohama --;

Title page,
Item [73], lines 2-3, under "Assignees," delete "Shun-ichiro Tanaka, Yokohama" and insert -- Kabushiki Kaisha Toshiba --.

Signed and Sealed this

Thirty-first Day of July, 2001

*Attest:*

*Nicholas P. Godici*

NICHOLAS P. GODICI
*Attesting Officer*          *Acting Director of the United States Patent and Trademark Office*